United States Patent [19]

Borsuk et al.

[11] 3,970,008
[45] July 20, 1976

[54] WALKING BEAM CONVEYER

[75] Inventors: Alvin Borsuk; Charles H. Johnson, both of Madison, Wis.

[73] Assignee: Oscar Mayer & Co. Inc., Madison, Wis.

[22] Filed: Mar. 11, 1975

[21] Appl. No.: 557,301

[52] U.S. Cl. ............................. 104/162; 198/34; 198/218
[51] Int. Cl.² ............................................. B61B 13/00
[58] Field of Search ........... 198/218, 221, 222, 227, 198/232, 34, 76; 104/162

[56] References Cited
UNITED STATES PATENTS

| | | | |
|---|---|---|---|
| 2,371,140 | 3/1945 | Alling et al. | 198/232 |
| 2,940,582 | 6/1960 | Boros | 198/218 |
| 2,956,524 | 10/1960 | Dewhurst et al. | 198/34 |
| 3,131,647 | 5/1964 | Hawley | 104/162 |
| 3,341,837 | 9/1967 | Washington | 198/40 |
| 3,411,616 | 11/1968 | Smith | 198/218 |

Primary Examiner—Evon C. Blunk
Assistant Examiner—Joseph E. Valenza
Attorney, Agent, or Firm—Lockwood, Dewey, Zickert & Alex

[57] ABSTRACT

A conveyer for indexing wheeled support magazines along a track or rail, including coacting moving and locking bars which alternately connect to the unit for either moving the unit from one position through a given distance to a next position or locking the unit at a position for a desired dwell time.

21 Claims, 14 Drawing Figures

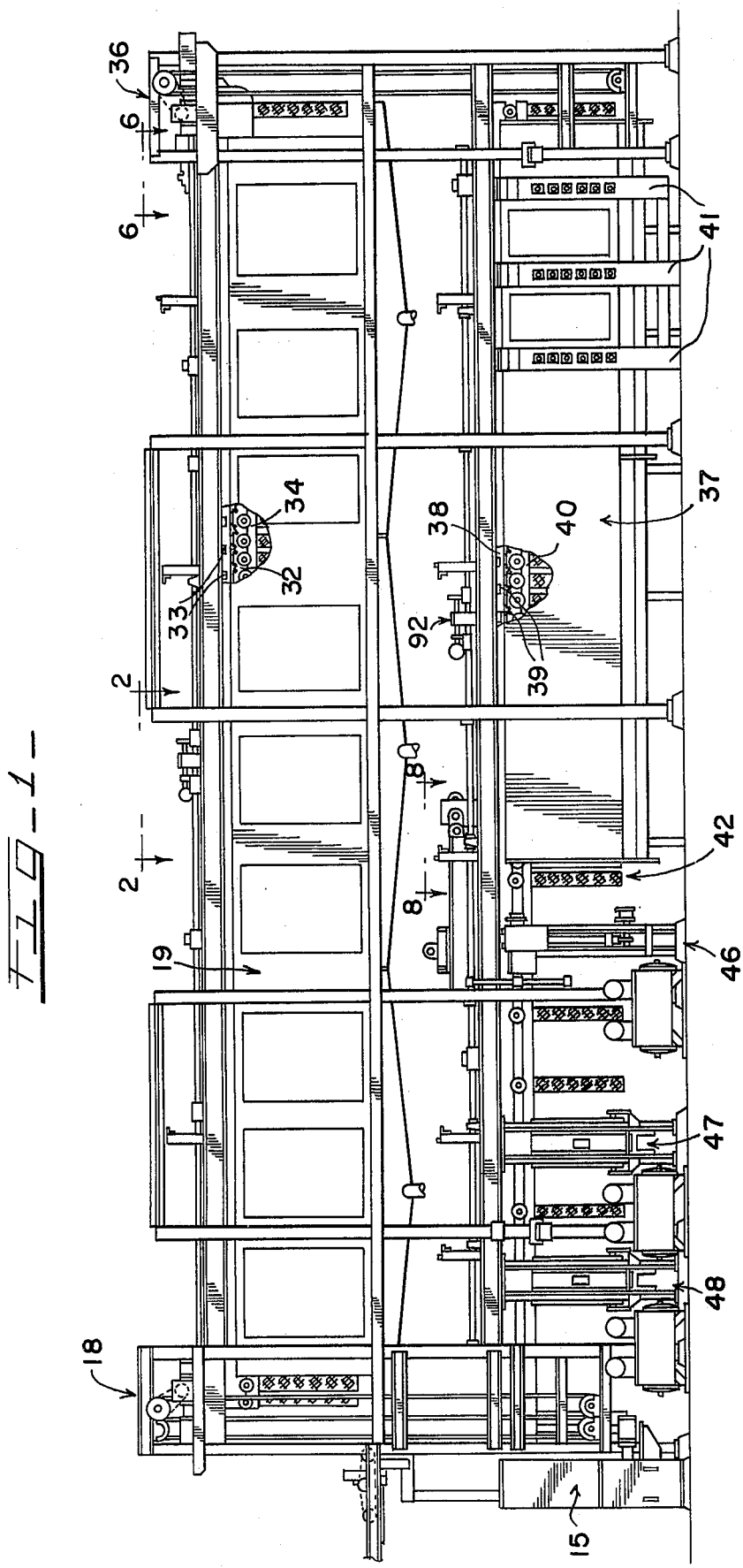

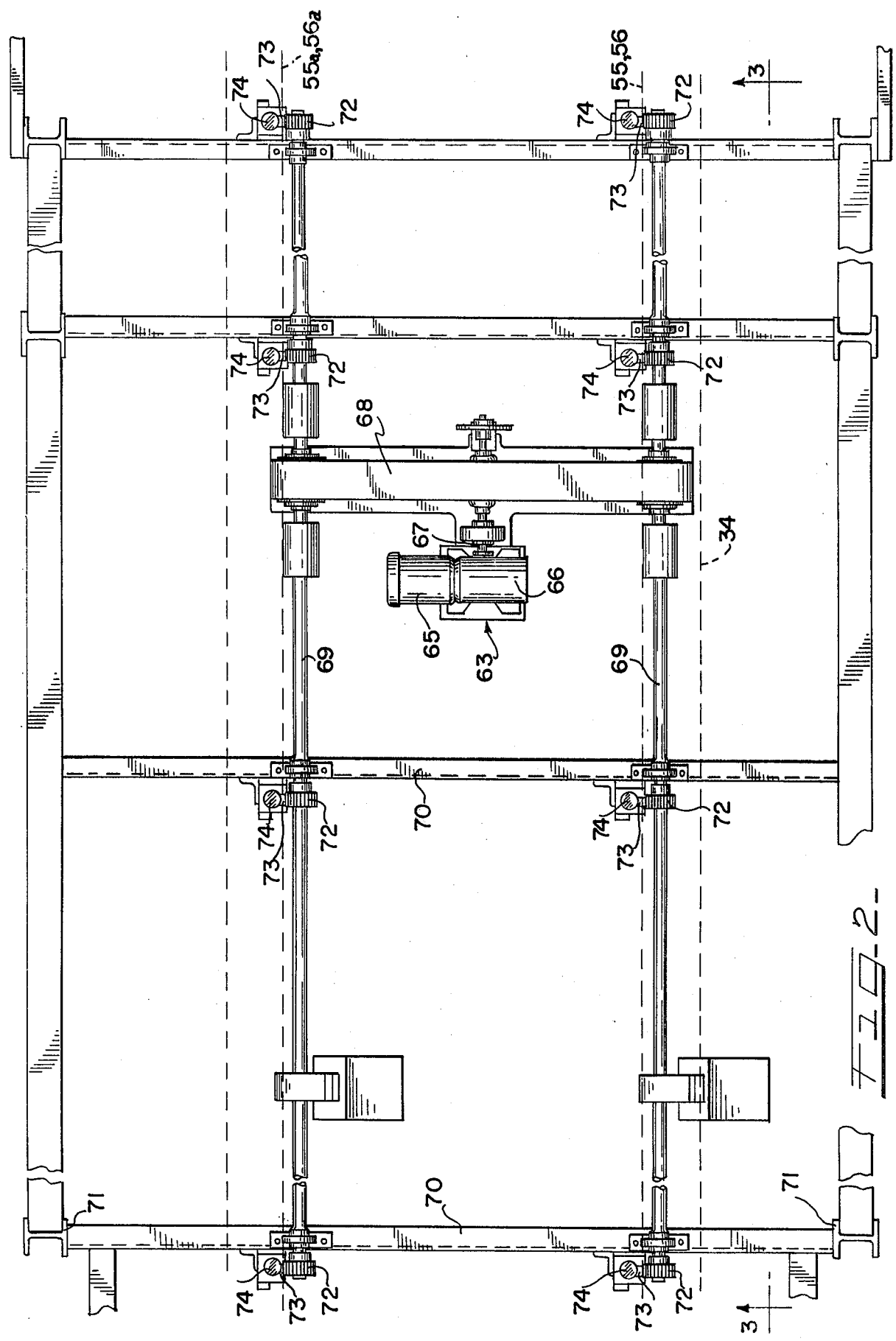

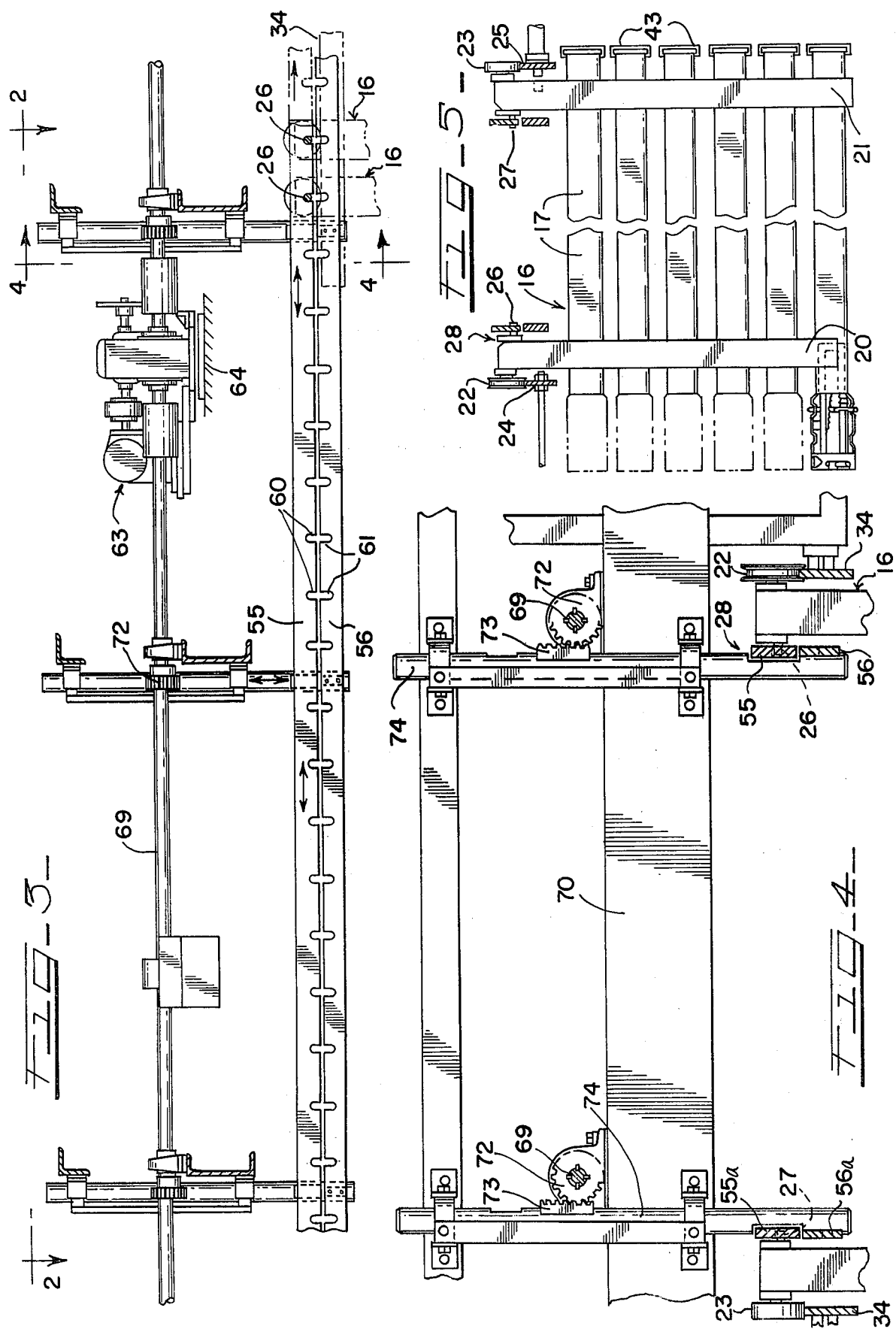

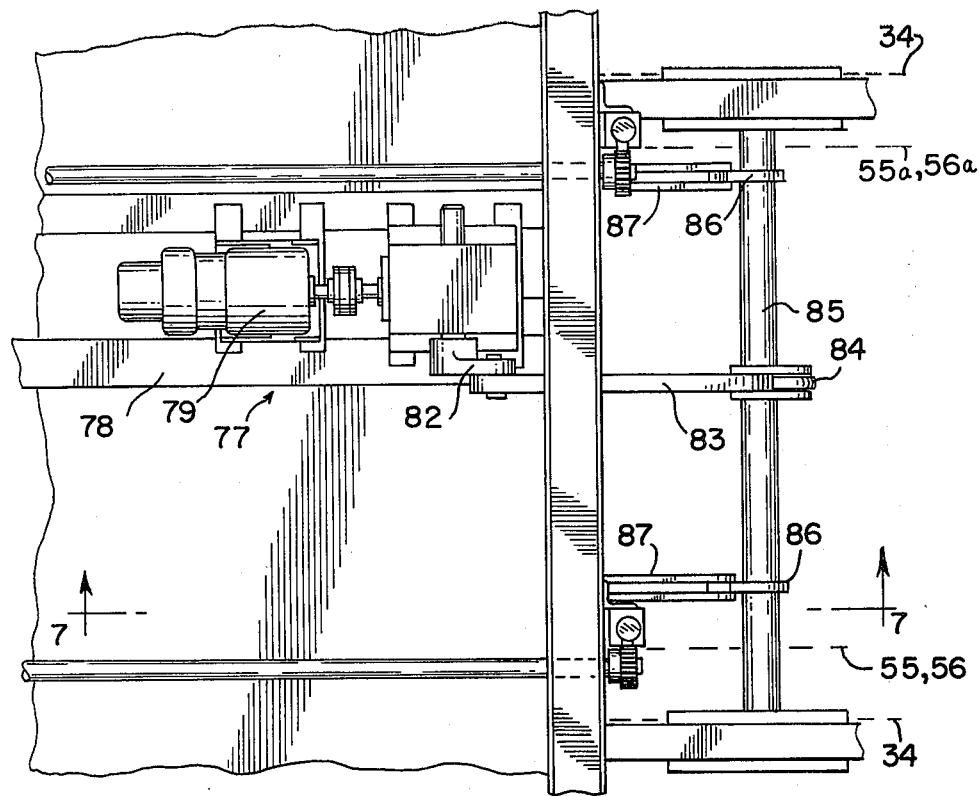
FIG_6_
FIG_7_
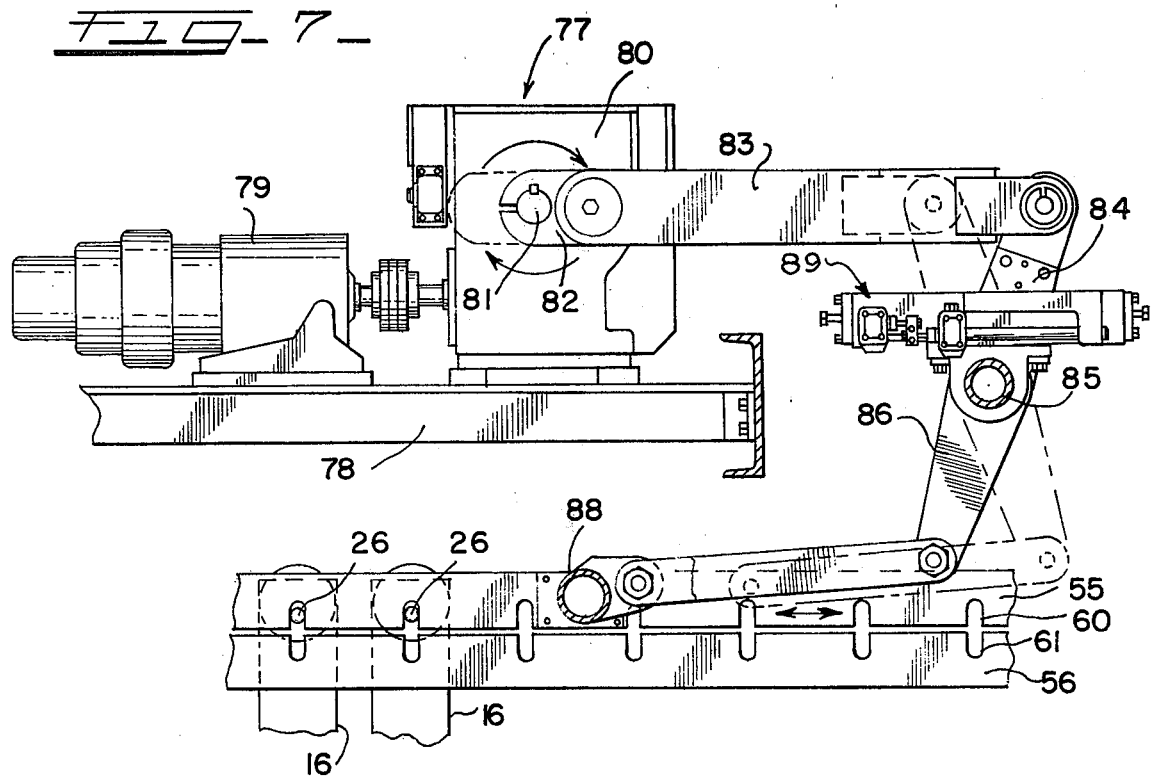

WALKING BEAM CONVEYER

This invention relates in general to a conveyer for indexing a unit along a given path through given positions, and more particularly to a conveyer capable of providing step-by-step movement for a trolley suspended structure along a trackway.

The conveyer of the present invention is particularly useful in a processing system where it is desirable to perform a number of processes on a product in sequence. For example, the conveyer will be illustrated in connection with a continuous loaf processing system where a loaf food product, such as meat, is made. More specifically, the conveyer of the invention will be shown for driving in a step-by-step fashion a plurality of magazines of loaf molds through cooking and chilling chambers where the molds are first loaded with a stuffable meat material, such as sausage batter or chunk meat. The magazines of molds are then transported through a cooking chamber by the conveyer of the invention in a step-by-step fashion so that absolute movement control of the magazines is achieved. At the completion of the cooking operation, the magazines are transferred to a chilling chamber where a conveyer according to the present invention in a step-by-step fashion moves the magazines through a chilling operation to chill the meat material in the molds. The conveyer then further moves the magazines through a product knockout station where the product is removed from the molds, a mold wash station where the molds are washed, and a release agent application station where the molds are coated with a release agent in preparation for the next stuffing operation. Because certain operations are performed in connection with the magazines of molds at certain stations, it is necessary to obtain precise positioning of the molds at the various stations. The conveyer of the present invention can accomplish this objective. It is further necessary in the continuous loaf processing system to increase the spacing between the magazines of molds at certain stations, and the present invention is capable of achieving this function.

The conveyer of the present invention includes trolleys for suspending units or wheel supported units guidably movable along a stationary track or rail. Driving pins are mounted on the trolleys for coaction with slotted locking and moving bars. The locking and moving bars coact such that one of the bars is always in engagement with the pins on the trolleys and such that as one bar disengages the pins, the other bar engages the pins. When the locking bar is in engagement with the pins, it serves to lock the trolleys at a given position. When the moving bar engages the pins, it is driven such that it serves to drive the trolley from one position to a next position. Accordingly, continuous control over the positions of the trolleys is achieved.

The moving and locking bars may be considered beams, and since the bars coact to give a step-by-step or intermittent movement to the trolleys, the invention may be considered to be a "walking beam" conveyer.

While conveyers that impart step-by-step movement to trolleys have been known, it has not been heretofore known to provide the step-by-step movement and position locking arrangement with a moving and locking bar assembly as in the present invention.

It is therefore an object of the present invention to provide a unique conveyer for imparting step-by-step movement to an article movable along a guide path.

Another object of this invention is in the provision of a walking beam conveyer for imparting step-by-step movement to a trolley suspended unit.

Still another object of the present invention resides in the provision of a conveyer for imparting step-by-step movement to a wheel supported unit and locking the unit at each position of movement for a desired period of time.

A still further object of this invention is in the provision of a conveyer for driving wheel supported units along a track in a step-by-step fashion and for varying the spacing between the units.

Other objects, features and advantages of the invention will be apparent from the following detailed disclosure, taken in conjunction with the accompanying sheets of drawings, wherein like reference numerals refer to like parts, in which:

FIG. 1 is a elevational view of an apparatus for carrying out continuous loaf processing of a food product and which utilizes the conveyer of the present invention;

FIG. 2 is a top plan view of a part of the conveyer according to the present invention taken substantially along line 2—2 of FIG. 1 to show the mechanism for driving the locking and moving rails along the vertical and with some parts diagrammatically illustrated for purposes of clarity;

FIG. 3 is an elevational sectional view taken substantially along line 3—3 of FIG. 2;

FIG. 4 is a transverse sectional view taken substantially along line 4—4 of FIG. 3;

FIG. 5 is a front elevational view of a magazine of loaf molds utilized in the continuous loaf processing apparatus shown in FIG. 1 and which facilitates explanation of the present invention;

FIG. 6 is a top plan view of the drive for imparting horizontal reciprocating movement to the moving bar of the conveyer according to the invention and taken generally along line 6—6 of FIG. 1;

FIG. 7 is a vertical sectional view taken substantially along line 7—7 of FIG. 6;

Figure 8:
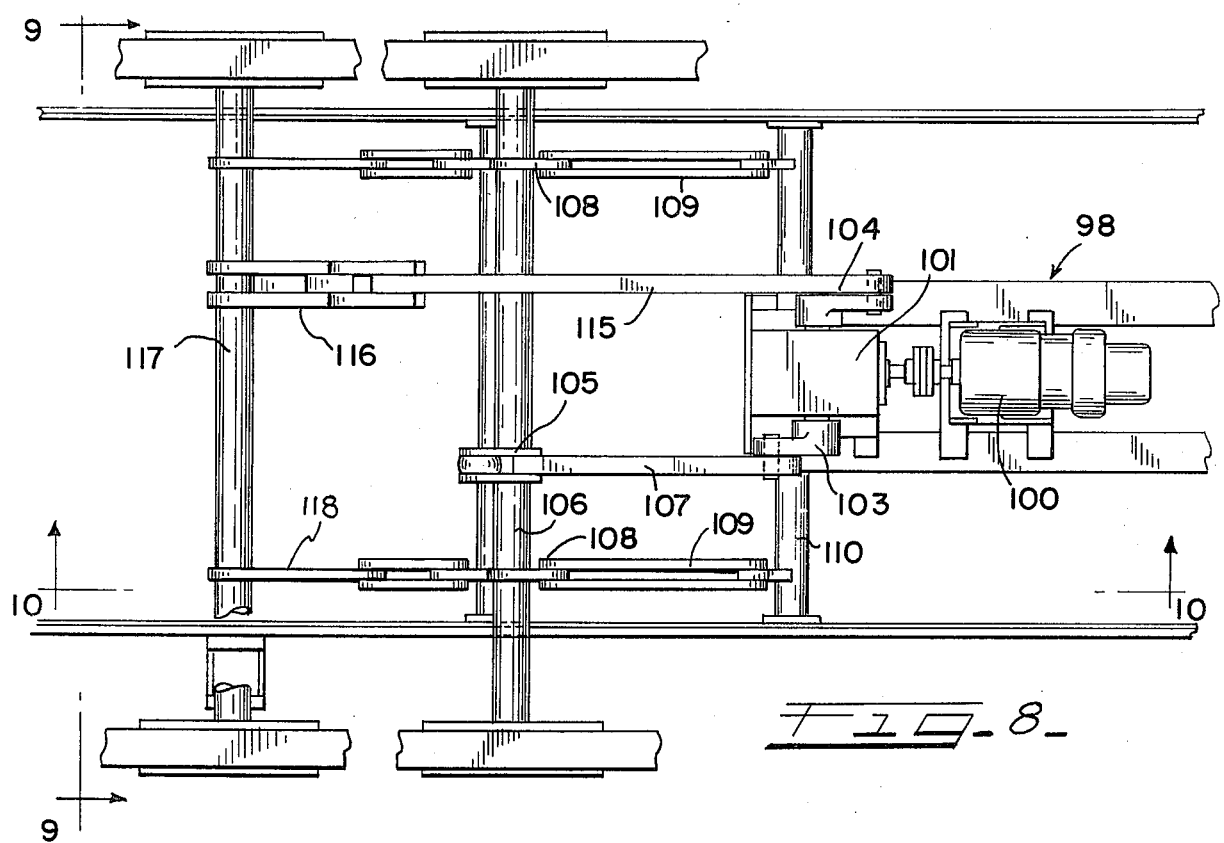
FIG. 8 is a top plan view of the moving bar drive for obtaining variable spacing by the magazines of loaves and taken generally along line 8—8 of FIG. 1.

Referring now to the drawings, and particularly to FIG. 1, an overall view of the continuous loaf processing apparatus in which the conveyer of the present invention may be utilized includes a stuffer 15 at a stuffer station which loads molds in a magazine with a stuffable meat material. A magazine of molds of the type utilized in this apparatus is shown in FIG. 5 and generally indicated by the numeral 16, and which is shown to include a plurality of horizontally extending and vertically arranged loaf molds 17. It can be appreciated the system includes a plurality of magazines 16 continuously movable for processing the meat material within the molds to ultimately produce the loaf meat product.

Following the stuffing of the molds of a magazine with a stuffable meat material, the magazine is transferred by a transfer mechanism 18 to a level where a cooking station or cooking zone 19 is provided. As seen in FIG. 5, the molds 17 are interconnected and connected with a pair of vertically arranged forks 20 and 21 having mounted at their upper ends wheels or rollers 22 and 23 which are adapted to be guidably moved along parallel arranged and horizontally extending tracks or rails 24 and 25. Driving pins or dogs 26 and 27 are also mounted at the upper ends of the forks 20 and 21 opposite the wheels 22 and 23 and which coact with the locking and moving bars of the conveyer 28 of the present invention.

The cook station 19 includes an elongated housing defining a cooking chamber 32 in which heat is generated by hot water spray from overhead nozzles 33. Within the cooking chamber 32, the conveyer of the present invention imparts a step-by-step movement to the magazines along cook rails or tracks 34.

Following the cooking operation, the magazines are lowered at the discharge end of the cooking chamber one at a time by a lowerer 36 to the inlet end of a chilling station 37. The chilling station 37 includes an elongated housing defining therein a chilling chamber 38 wherein a chilling action is imparted to the molds on the magazines by means of a plurality of overhead cold water spray nozzles 39 issuing cold water onto the molds. The magazines are movable through the chilling chamber on chill rails or tracks 40 by the conveyer of the present invention. Inasmuch as the meat material during cooking expands, means is provided on the molds for accommodating the expansion and which means is further operated during movement of the magazines in the chilling chamber to squeeze the material at the squeeze mechanisms 41. At the first position outside of the chilling chamber, as indicated in FIG. 1 at 42, the magazine of molds in that position is attended to by an operator to remove covers 43, FIG. 5, so that the product within the molds can be removed.

The spacing between the magazines is increased following the removal of the covers 43 at the position 42 in order to provide ample room for further operation in the system. The loaf meat product is removed from the molds at a product knockout station 46. Thereafter, the magazines of molds are individually treated to prepare them for the next stuffing operation by washing of the molds at the mold wash station 47 and by applying a suitable release agent to the molds at the release agent application station 48. Following application of the release agent, the magazines of molds are then returned to the stuffing station 15 for again being stuffed with the meat material. It is important to properly and precisely move the magazines throughout the continuous processing apparatus, and the conveyer of the present invention achieves this purpose.

The conveyer 28 of the invention is illustrated in FIGS. 2 to 7 as applicable to the cook rails 34 for driving the magazines 16 through the cooking chamber 32 to incrementally drive the magazines through a plurality of positions, each of which is equally spaced from the next adjacent positions. Accordingly, the magazines will be intermittently driven along the cook rails, it being appreciated the step-by-step movement will drive all of the magazines together through one step and then allow the magazines to dwell in their new positions for a given period of time. The operation of the overall apparatus is programmed so that the conveyer for the chill rails is synchronized with the conveyer for the cook rails to move the magazines along the chill rails one position when the magazines along the cook rails are being moved one position.

With special reference to FIGS. 3 to 7, the conveyer for the cook rails is shown to include a moving bar 55 and a locking bar 56 working together to control the position of the driving pins or dogs of the magazine. While the magazine 16 includes a pair of wheels or rollers riding on a pair of stationary tracks or rails 34, together with a pair of driving pins or dogs, one at each fork of the magazine, thereby necessitating a moving and locking bar combination for each of the pins, it can be appreciated the conveyer of the present invention may be equally useful to index or intermittently drive a structure supported by a single wheel or trolley assembly and move along a single rail. The width of the magazine 16 is such as to require support at both ends or sides, and to provide accurate movement control, it is therefore necessary to utilize a pair of locking and moving bar combinations as illustrated. A single trolley supported unit would need only one set of locking and moving bars. As will be more clear hereafter, movements of the locking and moving bars at both sides are synchronized. For simplicity purposes, the moving bars will be identified by the numerals 55 and 55a and the locking bars will be identified by the numerals 56 and 56a.

As seen in FIG. 3, the moving bars 55 are provided with downwardly opening and vertically arranged slots 60, while the locking bars are provided with upwardly opening and vertically arranged slots 61. The slots are equally spaced apart along the bars and the slots of the moving bars coact with the slots of the locking bars to at all times maintain connection with or engagement with the driving pins on the magazines. The moving and locking bars are arranged vertically in alignment with each other, as seen in FIG. 4, and the slots 60 and 61 are always aligned at the beginning and the end of the moving strokes of the moving bar.

The moving and locking bars are vertically movable together for causing engagement or connection between one bar and a pin on the magazine and disengagement of the other bar from the same pin on a magazine. In order to obtain movement along the vertical of these bars, a drive mechanism 63 mounted overhead of the bars through suitable connections effect the raising and lowering of the bars. The drive mechanism is mounted on a suitable support 64 and includes generally a motor 65, a reduction gear assembly 66 having an output shaft 67 connected to a transmission 68 which in turn is drivingly connected to longitudinally extending shafts 69, one each mounted above and adjacent to the spaced moving and locking bar assemblies. The shafts 69 are suitably bearingly mounted on cross beams 70 that are in turn supported by upright columns 71. A plurality of pinion gears 72 are mounted along the shafts 69 for engagement with rack gears 73 secured to vertically extending reciprocal rods 74 on which are supported and mounted the moving and locking bars 55 and 56. The locking bars 56 are fixed to the rods 74, while the moving bars 55 are slidably carried by the rods so that they can be horizontally reciprocated when intermittently driving the magazines in a step-by-step fashion. Inasmuch as the driving pins of the magazines move along a fixed line parallel to the cook rails 34, raising and lowering of the moving and locking bars by the drive mechanism 63 causes selective engagement and disengagement between the bars and the driving pins. Specifically, when the moving and locking bars are in the down position, as shown in FIGS. 3 and 4, the driving pins of the magazines will be engaged by the slot 60 of the moving bar so that movement of the magazines can be effected. Conversely, when the moving and locking bars are in their up position, the pins are disengaged from the slot 60 in the moving bar and engage in the slot 61 of the locking bar to lock the magazines against movement.

The drive mechanism for effecting reciprocation of the moving bar, both when the moving bars are connected to the magazines by engagement of the slots 60 with the magazine driving pins and when the moving bars are disengaged from the magazines, is generally shown in FIGS. 6 and 7. This drive mechanism, which is generally indicated by the numeral 77, is also overhead mounted relative to the moving and locking bars and the stationary cook rails and is mounted on a support 78 that is in turn suitably mounted on the framework of the overall machine. The drive mechanism 77 includes a motor 79 which drives a gear box 80 having an output shaft 81 on which is mounted a crank arm 82. A link 83 connects the crank arm 82 to an input crank arm 84 mounted on a horizontally mounted crank shaft 85 that extends perpendicular to the moving and locking bars. A pair of output crank arms 86 are connected through links 87 to a transversely extending drive arm 88 connected at opposite ends to the moving bars 55 and 55a which imparts reciprocal movement to the moving bar. The location of the cook rails 34 and the moving and locking bars 55 and 56 is shown in dotted lines in FIGS. 2 and 6 for clarification. Accordingly, movement of the moving bars through a drive stroke and a return stroke is programmed through the drive mechanisms 77 in coordination with the operation of the drive mechanism 63 which raises and lowers the moving and locking bars. In the event of a jam-up along the conveyer which would cause a force between the moving bar 55 and the bearings for crank shaft 85 to exceed a predetermined level thereby overloading the bearings and supporting structures, an overload device 89, FIG. 7, is triggered to stop the drive mechanism 77 and the drive mechanism 63 and to operate a suitable alarm. The overload device would provide for movably mounting the crankshaft bearing to trigger a switch in a suitable manner.

Figure 9:
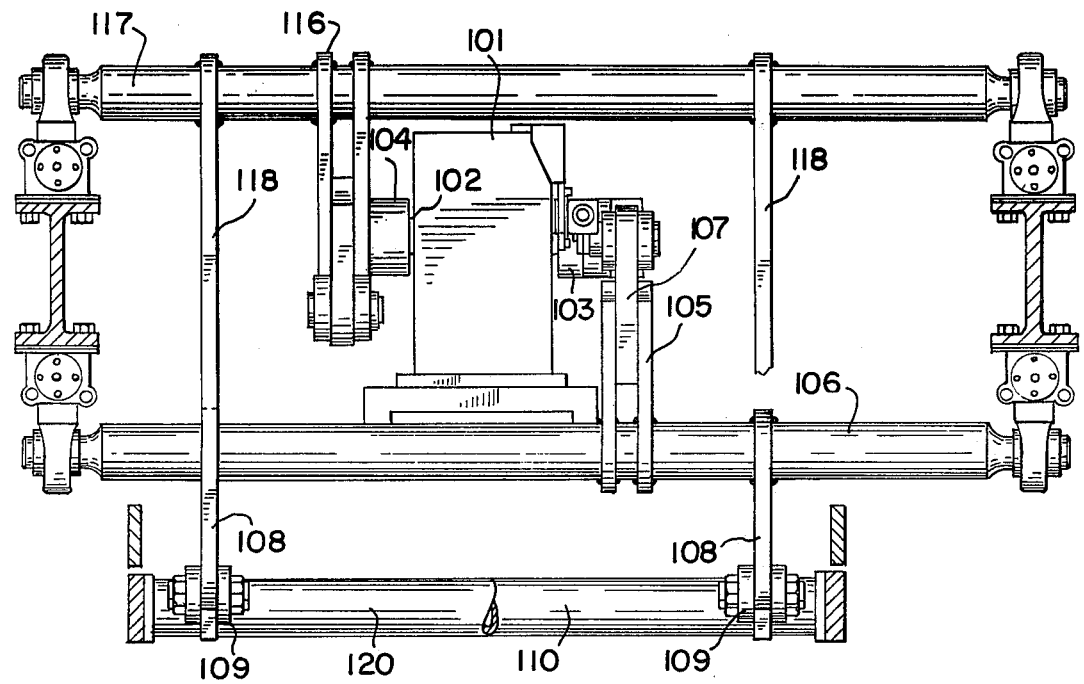
FIG. 9 is a transverse sectional view taken substantially along line 9—9 of FIG. 8.
Figure 10:
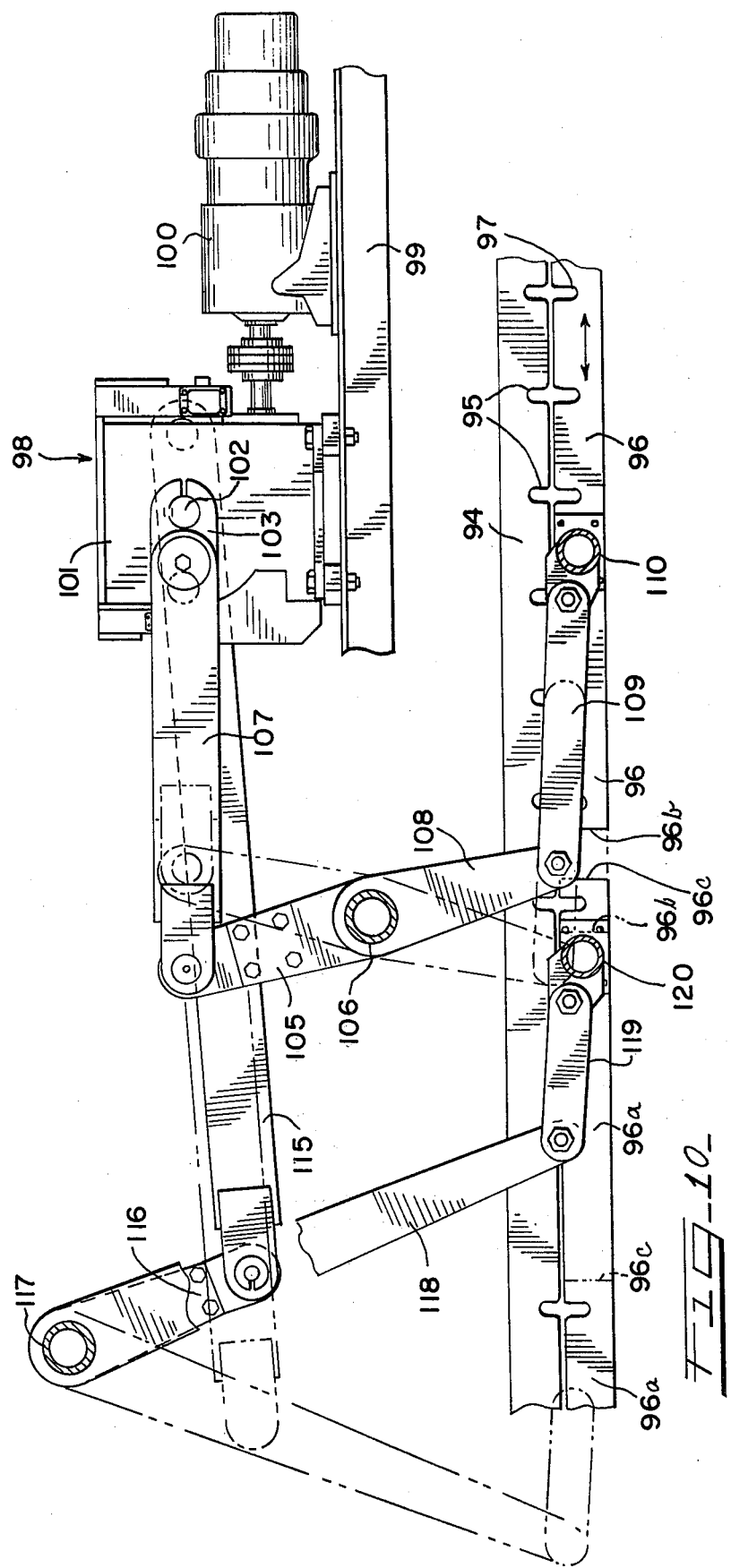
FIG. 10 is a longitudinal sectional view taken substantially along line 10—10 of FIG. 8.
Figure 11:
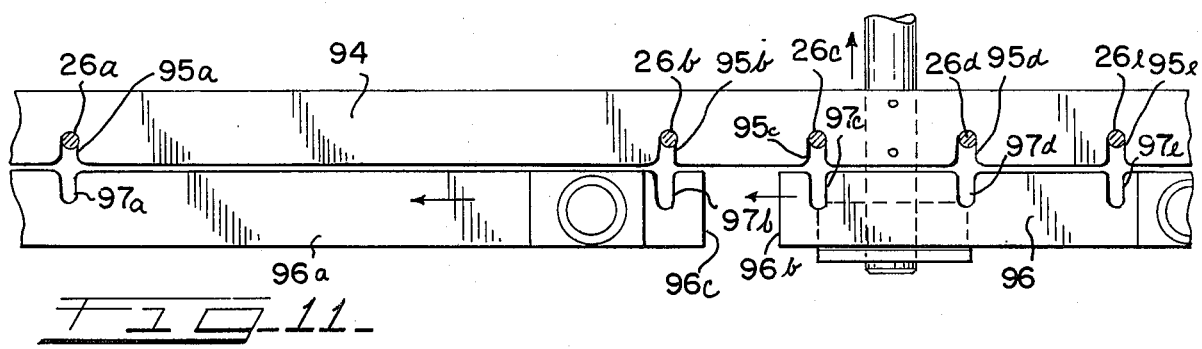
FIGS. 11, 12, 13 and 14 are generally diagrammatic views of the locking and moving bars to illustrate their sequential operation as well as the manner in which variable spacing of the movable units is achieved.

The raising and lowering mechanism for the moving and locking bars in the chill zone is generally indicated by the numeral 92 in FIG. 9 and is of the same construction as the raising and lowering mechanism for the moving and locking bars in the cook section and therefore need not be shown in detail. It will also be appreciated that reference to the chill rails or tracks 40 includes the tracks which extend through the entire lower part of the system shown in FIG. 1, and therefore through the product knockout station 46, the mold wash station 47, and the release agent application station 48. It can further be recognized that the conveyer of the present invention is capable of being used wherever there is a need to intermittently drive a guidably supported unit, and that for purposes of understanding the invention, it is here shown in connection with a continuous loaf processing system. The conveyer used for the chill rails differs in that the positions of the moving bars and locking bars are reversed and the manner in which a change in the spacing between the magazines can be accomplished is illustrated in connection with the chill rails. Accordingly, details on the drive mechanism for the moving rails are shown in FIGS. 8 to 10, while the overall operation of the conveyer for the chill rails is illustrated diagrammatically in FIGS. 11 to 14.

The locking bars in this embodiment are designated by the numeral 94 and are shown to be continuous for the entire stretch of the chill rails. Here the locking bars are provided with downwardly opening slots 95. The moving bars are in two sections 96 and 96a with upwardly opening slots 97 for coacting with the slots 95 in the locking bar.

Driving of the moving bars 96 and 96a is achieved by a single drive mechanism 98 mounted on a support 99. This drive mechanism includes a motor 100 drivingly connected to a gear box 101 having an output shaft 102 with a crank arm 103 mounted on one end and a crank arm 104 mounted on the other end. The crank arm 103 is connected to an input crank arm 105 on a rock shaft 106 by a link 107. Oscillating movement of the rock shaft 106 reciprocally drives the moving bar 96 through output crank arms 108, connecting links 109 and a drive bar 110 which is connected at opposite ends to the moving bars 96. The drive bar 110 extends perpendicular to the moving bars 96 and is parallel to the rock or crank shaft 106 and the output shaft 102 of the gear box 101.

The crank arm 104 on the output shaft 102 of the gear box 101 is pivotally connected to a connecting link 115 that is in turn pivotally connected to an input crank arm 116 on crank or rock shaft 117. The crank shaft 117 extends perpendicular to the moving and locking rails and is parallel to the output shaft 102 as well as the crank shaft 106. It will be appreciated that the crank shafts 106 and 117 are suitably pivotially mounted. A pair of output crank arms 118 extend from the crank shaft 117 and are pivotally connected to links 119 that are in turn connected to a drive bar 120 which is secured at opposite ends to the moving rails 96a. It can be readily seen in FIGS. 8, 9 and 10 that while the throw on the crank arms 103 and 104 is identical, the throws on the output crank arms 108 and 118 are considerably different to obtain the variable movement between the moving bars 96 and 96a. As seen in FIG. 10, the parts shown in solid line are in the home or return position wherein the end 96b of moving bar 96 is positioned close to the end 96c of moving bar 96a. These ends are widely spread apart at the conclusion of the moving strokes of the moving bars, as indicated by their dotted-line positions.

Figure 12:
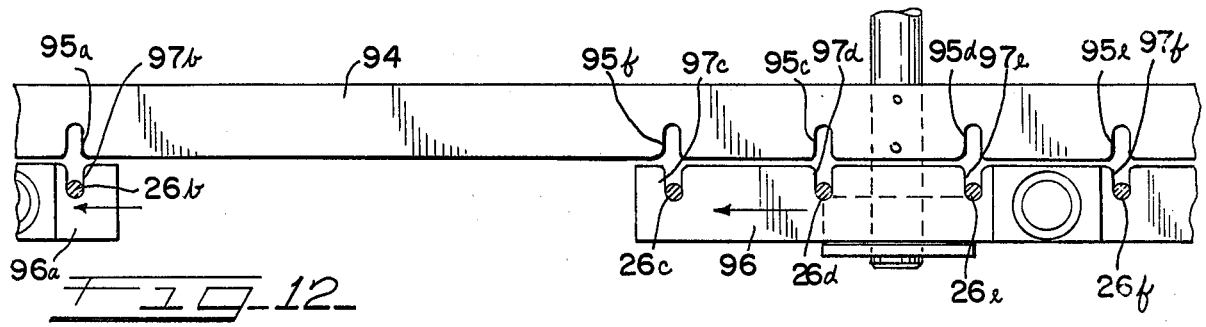
Figure 13:
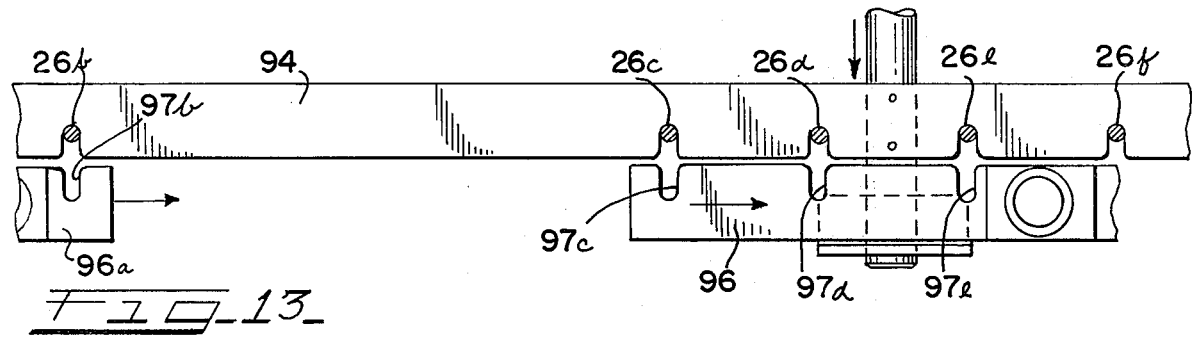
Figure 14:
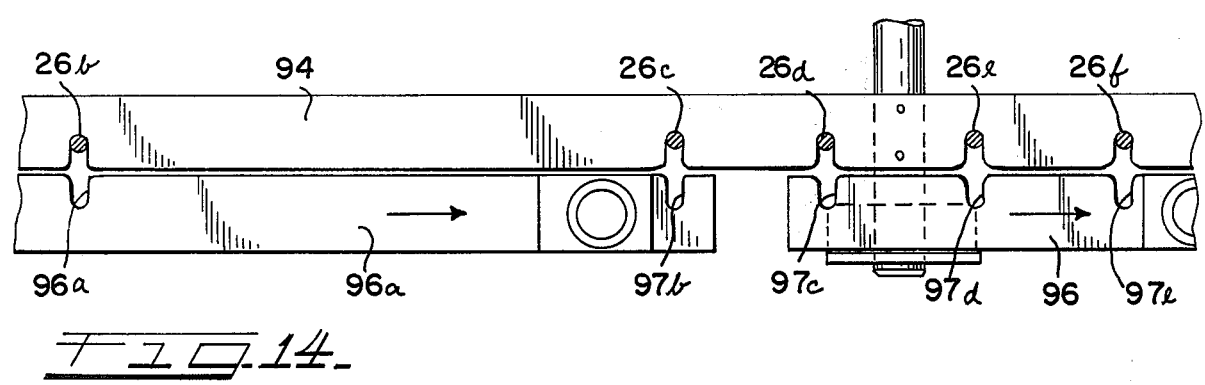

A more clear understanding of the manner in which variable spacing of the magazines is obtained may be had by reference to FIGS. 11 to 14. The magazines are represented in dwell position in FIG. 11 with the locking bars 94 connecting with the magazines through the magazine pins 26 and slots 95. Likewise, the moving bars are in dwell position or home position where their slots 97 are in alignment with the slots on the locking bar. FIG. 12 illustrates the locking and moving bars in their uppermost position where the magazines have been disconnected from the locking bar and connected to the moving bars by virtue of the pins 26 engaging in the slots 97 of the moving bars. Further, FIG. 12 shows the moving bars having advanced one position where the slots 97c, 97d, 97e and 97f of the moving bar 96 are now in alignment with the slots 95b, 95c, 95d and 95e, thereby advancing the magazine pins 26c, 26d, 26e and 26f into alignment with the locking bar slots 95 b, 95c, 95d and 95e. Further, the moving bar 96a, which receives the magazine pin 26b from the locking bar slot 95b, has advanced the magazine pin to be in alignment with the locking bar slot 95a. At this point, as shown in FIG. 13, the locking and moving bars are moved downwardly to release the magazine pins from the locking bars and at the same time cause engagement of the pins by the locking bar to lock the magazines in position, after which the moving bars return to their home position, as shown in FIG. 14. The spacing between the slots on the moving bar 96a are greater than the spacing between the slots on the moving bar 96. Further, the last locking bar slot 95b ahead of the spacing differential is essentially common to the close spacing of the slots in the locking bar and the wider spacing, and it is from this point that a magazine, when connected to the moving bar 96a, takes a greater step when moved by the moving bar 96. While it is illustrated here that the magazine spacing is increased from one point along the chill rails to another point, it can be appreciated that the spacing could be decreased within the scope of the present invention by reversal of the mechanisms.

It can be further appreciated that while connection and disconnection between the locking and moving bars and the magazines is obtained by use of slots and pins, other types of connection means may be utilized within the scope of the invention. Further, although the tracks or rails on which the magazines are moved are straight and horizontal, it may be recognized that they may be on an incline if so desired. It may even be possible to arcuately form the tracks, in which case it would be necessary to arcuately form the moving and locking bars. While only one change in spacing between the magazines is illustrated in FIG. 1, it can be appreciated that any number of changes in spacing may be provided if so desired, and the spacing may go from close to wide or wide to close, or both, along one support track. Further, while the moving and locking bars are overhead of the units being moved, they may be underneath if desired, such as where the support tracks are at the floor line. The moving and locking bars might also be referred to as beams, wherein the moving bar would essentially constitute the walking beam, since it serves to effect movement of the magazine or unit guidably mounted along a given path.

From the foregoing, it can be appreciated the conveyer of the present invention illustrates a positive intermittent driving mechanism which maintains control over the positions of the units being driven at all times. Therefore, precise positioning of a unit can be obtained.

It will be understood that modifications and variations may be effected without departing from the scope of the novel concepts of the present invention, but it is understood that this application is to be limited only by the scope of the appended claims.

The invention is hereby claimed as follows:

1. Apparatus for intermittently driving a unit supported for guided movement along a given path through a given distance and locking the unit in a given position, comprising: a locking bar and a moving bar, each said bar having a plurality of connecting means equally spaced apart therealong for selective connection with the unit, means above said bars for supporting and driving said bars together along a first axis extending perpendicular to said given path of movement such that one bar is at all times connected to the unit and such that as one bar connects to the unit the other bar disconnects from the unit, said locking bar being rigidly connected to said supporting and driving means and said moving bar being slidably supported thereby for movement along an axis parallel to said given path of movement, and means driving said moving bar when it is connected to the unit through a given distance to align one connecting means thereof with the next adjacent connecting means of the locking bar to move the unit to a new position and to return the moving bar to its starting position when it disengages from the unit and a connecting means of the locking bar engages the unit, whereby the locking bar locks the unit in a given position and the moving bar moves the unit from one position to another.

2. Apparatus as defined in claim 1, wherein said given path is defined by a track and said unit includes rolling means engaging the track.

3. Apparatus as defined in claim 2, wherein said track is straight and horizontally extending.

4. Apparatus as defined in claim 1, wherein said connecting means on said bars are defined by slots therein and a pin is provided on the unit for coacting with the slots.

5. Apparatus as defined in claim 4, wherein said slots on said bars oppose one another when the moving bar is at its starting position or at a new position.

6. Apparatus as defined in claim 5, wherein said bars extend parallel to the track and are arranged one above the other.

7. Apparatus as defined in claim 6, wherein the locking bar is above the moving bar.

8. Apparatus as defined in claim 6, wherein the locking bar is below the moving bar.

9. Apparatus as defined in claim 6, wherein the slots in said bars are vertically arranged, and said means supporting and driving said bars so that a slot of one bar is at all times engaging the pin includes means for raising and lowering said bars along the vertical.

10. Apparatus for intermittently driving a unit supported for guided movement along a given path through a given distance and locking the unit in a given position and for changing the given distance at a given point along the path, comprising: a locking bar, a first moving bar, a second moving bar, a plurality of connecting means equally spaced apart a first distance along said first moving bar, a plurality of first connecting means equally spaced apart said first distance along said locking bar coacting with the connecting means of said first moving bar, a plurality of connecting means equally spaced apart a second distance along said second moving bar, a plurality of second connecting means equally spaced apart said second distance along said locking bar coacting with the connecting means of said second moving bar, said plurality of first and second connecting means having one common connecting means, means for driving said bars such that one bar is at all times connected to the unit and such that as one of the moving bars connects to the unit the locking bar disconnects from the unit, and means driving said moving bars when either of said moving bars is connected to the unit through a given distance to align one connecting means thereof with the next to move the unit to a new position and return the locking bars to their starting positions when the moving bar connected to the unit disengages therefrom and a connecting means of the locking bar engages the unit, whereby the locking bar locks the unit in a given position and the moving bars move the unit from one position to another.

11. Apparatus as defined in claim 10, wherein said given path is defined by a track and said unit includes rolling means engaging the track.

12. Apparatus as defined in claim 11, wherein said track is straight and horizontally extending.

13. Apparatus as defined in claim 10, wherein said connecting means on said bars are defined by slots therein and a pin is provided on the unit for coacting with the slots.

14. Apparatus as defined in claim 10, wherein said moving bars driving means includes commonly powered mechanism for driving said first moving bar through said first distance and said second moving bar through said second distance.

15. A conveyer for intermittently moving a wheel supported assembly a given distance along a track, wherein said assembly includes a driving pin extending perpendicular to the track, said conveyer comprising: a locking bar coacting with said pin for intermittently locking the assembly in a given position, a moving bar coacting with the locking bar and the pin to intermittently engage said pin and drive the assembly said given distance, said bars extending parallel to said track, slots in said bars equally spaced apart a distance equal to said given distance coacting with said driving pin, means supporting said bars one above the other with the slots facing each other and for vertical movement, means connected to said supporting means for raising and lowering said bars to cause engagement between the driving pin and a slot in one of the bars, said locking bar being rigidly connected to said supporting means and said moving bar being slidably supported thereby for movement along an axis parallel to said track, and means for driving said moving bar when a slot in the moving bar engages the pin to move the assembly such that the pin moves from alignment with one slot in the locking bar to alignment with the next adjacent slot and to return the moving bar to its previous position after disengaging the moving bar from the pin.

16. A conveyer as defined in claim 15, wherein the locking and moving bars are vertically arranged one above the other and the locking bar is above the moving bar.

17. A conveyer as defined in claim 15, wherein the locking and moving bars are vertically arranged one above the other and the locking bar is below the moving bar.

18. In combination with an assembly having a pair of coaxially mounted horizontally spaced and vertically arranged wheels riding on a pair of spaced apart parallel stationary rails for movement therealong, and a driving pin adjacent each wheel, a conveyer for intermittently driving the assembly along the rails a given distance and locking the assembly in given positions, said conveyer comprising: a pair of locking bars, a pair of moving bars, one of said locking bars coacting with one of said moving bars and with one of said pins, the other of said locking bars coacting with the other of said moving bars and with the other of said pins, a plurality of connecting means equally spaced apart on said bars, means above said bars for supporting and driving said bars together along a first axis extending perpendicular to said rails such that a connecting means on one of each coacting locking and moving bars being at all times in engagement with a pin, said locking bars being rigidly connected to said supporting and driving means and said moving bars being slidably supported thereby for movement along an axis parallel to said rails, and means for driving said moving bars such that when their connecting means engages a pin the assembly will be driven to align with the next adjacent connection means of the locking bars.

19. The conveyer defined in claim 18, wherein said connecting means includes slots or notches formed in said bars.

20. The conveyer defined in claim 19, wherein each set of moving and locking bars are vertically arranged one above the other and the slots of the bars oppose one another when the moving bar is at its starting position or at a new position.

21. The conveyer defined in claim 19, which further includes means responsive to an overload on the moving bars for stopping both bar driving means and operating an alarm.

* * * * *